United States Patent
Takao et al.

(10) Patent No.: US 7,117,444 B2
(45) Date of Patent: Oct. 3, 2006

(54) OPERATION SCREEN SIMPLE-CREATING SYSTEM FOR A REMOTE CONTROL TERMINAL

(75) Inventors: Toshiyuki Takao, Tokyo (JP); Koji Nakamura, Tokyo (JP); Shigeharu Hara, Tokyo (JP); Shinsuke Kato, Tokyo (JP)

(73) Assignee: Fuji Photo Film Co., LTD, Minami-Ashigara (JP)

( * ) Notice: Subject to any disclaimer, the term of this patent is extended or adjusted under 35 U.S.C. 154(b) by 494 days.

(21) Appl. No.: 09/768,466

(22) Filed: Jan. 25, 2001

(65) Prior Publication Data

US 2001/0011297 A1  Aug. 2, 2001

(30) Foreign Application Priority Data

Jan. 27, 2000  (JP)  ............................ 2000-019141

(51) Int. Cl.
   G06F 3/00  (2006.01)
   G03G 15/36  (2006.01)

(52) U.S. Cl. .................... 715/740; 715/769; 399/182

(58) Field of Classification Search ................. 399/81, 399/182, 8, 75; 345/634, 760, 744, 765, 345/770, 769; 400/76; 700/17, 237; 707/10; 725/131; 715/769, 740
   See application file for complete search history.

(56) References Cited

U.S. PATENT DOCUMENTS

| | | | |
|---|---|---|---|
| 4,987,486 A * | 1/1991 | Johnson et al. | 725/131 |
| 5,159,546 A * | 10/1992 | Inoue et al. | 700/17 |
| 5,373,349 A * | 12/1994 | Ito | 399/8 |
| 5,513,117 A * | 4/1996 | Small | 700/233 |
| 5,748,484 A * | 5/1998 | Cannon et al. | 700/233 |
| 5,774,759 A * | 6/1998 | Tanaka | 399/8 |
| 5,784,487 A * | 7/1998 | Cooperman | 382/175 |
| 5,883,611 A * | 3/1999 | Usami | 345/634 |
| 6,286,003 B1 * | 9/2001 | Muta | 707/10 |
| 6,385,412 B1 * | 5/2002 | Sadakuni | 399/75 |
| 6,406,199 B1 * | 6/2002 | Hayashi | 400/76 |
| 6,529,214 B1 * | 3/2003 | Chase et al. | 345/744 |
| 2002/0054115 A1 * | 5/2002 | Mack et al. | 345/765 |

FOREIGN PATENT DOCUMENTS

JP  7-307817  11/1995

OTHER PUBLICATIONS

Microsoft® Word 2000, copyright 1999 (Screenshots 1-8).*
European Search Report dated Jun. 22, 2004.
Strider, et al. "Unofficial WinAMP Skin Specifications, version 1.2.1" [Internet Document],URL:http://web.archive.org/web/20000423163108/http://www.algonet.seμdaniel7/winamp/skinspecs.pdf>, Apr. 26, 1998.
Nullsoft, Inc. "About Winamp" [Internet Document] URL:http://web.archive.org/web/19981205015145/http://winamp.com/>], Dec. 5, 1998.

(Continued)

Primary Examiner—Kieu Vu
Assistant Examiner—Ting Zhou
(74) Attorney, Agent, or Firm—McGinn IP Law Group PLLC (57) ABSTRACT

An operation screen simple-creating system for creating an operation screen used for a remote controlling terminal that remotely controls a terminal connected to a communication line, includes: a paste-up information receiving unit for receiving paste-up information to paste on the operation screen; a paste-up information setting unit for setting the position and size of said paste-up information to be pasted on the operation screen; and an operation screen creating unit for creating a new operation screen according to the result of the setting set by the paste-up information setting unit.

29 Claims, 5 Drawing Sheets

OTHER PUBLICATIONS

Wayback Machine Internet Archive Wayback Machine [Internet Document] URL:http://web.archive.org/web/*/www.winamp.com/>, May 13, 2004.

Skinner, J.M., et al.: "A user-extensible graphical user interface for control of either instrument-control program, ACE or *spec*", Dec. 11, 1996, pp. 627-630.

* cited by examiner

OPERATION SCREEN SIMPLE-CREATING SYSTEM FOR A REMOTE CONTROL TERMINAL

This patent application claims priority from a Japanese patent application No. 2000-019141 filed on Jan. 27, 2000, the contents of which are incorporated herein by reference.

BACKGROUND OF THE INVENTION

1. Field of the Invention

The present invention relates to a system for creating an operation screen for a remote control terminal. In particular, the present invention relates to a system for creating an operation screen for a remote control terminal whose users are able to customize a plurality of operation screens displayed on a remote control terminal. The present invention may apply to a creation of operation screens for a printer remote controlling terminal.

2. Description of the Related Art

A printer remote controlling terminal, which can remote control a printer connected to a communication line, is known. When creating an operation screen for this type of printer operating system, each screen page is made individually. Here, a printer operating system is described as an example of a system using a remote controlling terminal.

A system for printing using a printer remote controlling terminal that can remote control a printer connected to a communication line may be offered as a service described in the following. Supposing a company has a printer that prints out high quality pictures compared to the other printers used in public and also has a lot of printer remote controlling terminals that can remote control the printer. It is a service that customers use these printer remote controlling terminals and print out images that they want to print out using the high quality picture printer. The company which provides this service may want to display its company name, logos, and messages to customers on the operation screen pages of the printer remote controlling terminal and want to make PR campaigns and improve its service to its customers. However, since there are many different kinds of screen pages, such as a welcome screen and a print in progress screen, for the operation screens of the printer remote controlling terminal according to the conventional art, it takes a lot of time and effort to make these screen pages individually.

As a reference, the Japanese Patent Application Laid-Open No.H7-307817 discloses an art for altering displays of operation screens of a facsimile. However, the art does not lighten the burden of making operation screens for companies as described above but can only make alterations for the predetermined layouts of menu items.

In describing the above problems, a printer is used as a terminal. The same types of problems may be applied to remote controlling of terminals other than printers.

SUMMARY OF THE INVENTION

Therefore, it is an object of the present invention to provide a system for simply creating an operation screen for a remote control terminal, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an operation screen simple-creating system for creating an operation screen used for a remote controlling terminal that remotely controls a terminal connected to a communication line, which includes: a paste-up information receiving unit for receiving paste-up information to paste on the operation screen; a paste-up information setting unit for setting the position and size of the paste-up information to be pasted on the operation screen; and an operation screen creating unit for creating a new operation screen according to the result of the setting set by the paste-up information setting unit.

The paste-up information receiving unit may include at least one of an image data reading unit for receiving image data and a text data receiving unit for receiving text data.

The paste-up information receiving unit may read out the paste-up information from a file recorded in a connected external memory device to be communicated from the remote controlling terminal.

The paste-up information setting unit may undertake an automatic positioning setting process for coinciding a barycenter of the paste-up information received by the paste-up information receiving unit with a predetermined point on the operation screen.

The automatic positioning setting process may be conducted when the paste-up information is moved to the amount of a predetermined ratio in a predetermined position on the operation screen in which the paste-up information is to be pasted.

The operation screen creating unit may create a plurality of the operation screens all together, having different designs based on a common setting value relating to a position, size, and direction of the paste-up information.

The operation screen simple-creating system may further include a paste-up information storing unit connecting to the communication line, the paste-up information storing unit connecting to and communicating with a plurality of the remote controlling terminals for storing therein a setting value relating to a position, size and direction of the paste-up information set by the paste-up information setting unit, wherein the operation screen of the plurality of remote controlling terminals is updated in accordance with the setting value of the paste-up information stored in the paste-up information storing unit.

According to the second aspect of the present invention, an operation screen simple creating method for creating an operation screen used for a remote controlling terminal that remotely controls a terminal connected to a communication line, which includes: receiving paste-up information to paste on the operation screen; setting the position and size of the paste-up information to be pasted on the operation screen; and creating a new operation screen according to the setting set by the paste-up information setting unit.

The receiving may include at least either receiving image data or receiving text data. The receiving may read out the paste-up information from a file recorded in a connected external memory device to be communicated from the remote controlling terminal.

The setting may undertake an automatic positioning setting for coinciding a barycenter of the paste-up information received by the paste-up information receiving unit with a predetermined point in the operation screen.

The automatic positioning setting may be conducted when the paste-up information is moved to the amount of a predetermined ratio in a predetermined position on the operation screen in which the paste-up information is to be pasted.

The creating may create a plurality of the operation screens all together, having different designs based on a common setting value relating to a position, size, and direction of the paste-up information.

The operation screen simple creating method may further include storing in the paste-up information storing unit connected to the communication line a setting value relating to a position, size, and direction of the paste-up information set by the paste-up information setting unit, the operation screen simple creating method updating the operation screen of the plurality of remote controlling terminals by using the setting value of the paste-up information stored in the paste-up information storing unit.

According to the third aspect of the present invention, a recording medium that stores a program for creating an operation screen used for a remote controlling terminal that remotely controls a terminal connected to a communication line, the program includes: receiving paste-up information to paste on the operation screen; setting the position and size of the paste-up information to be pasted on the operation screen; and creating the new operation screen according to the setting set by the paste-up information setting unit.

The receiving may include at least either receiving image data or receiving text data. The receiving may read out the paste-up information from a file recorded in a connected external memory device to be communicated from the remote controlling terminal.

The setting may undertake an automatic positioning setting for coinciding a barycenter of the paste-up information received by the paste-up information receiving unit with a predetermined point in the operation screen.

The automatic positioning setting may be conducted when the paste-up information is moved to the amount of a predetermined ratio in a predetermined position on the operation screen in which the paste-up information is to be pasted.

The creating may create a plurality of the operation screens all together, having different designs based on a common setting value relating to a position, size, and direction of the paste-up information.

The program of the recording medium may further include storing in the paste-up information storing unit connected to the communication line a setting value relating to a position, size, and direction of the paste-up information set by the paste-up information setting unit, the program updating the operation screen of the plurality of remote controlling terminals by using the setting value of the paste-up information stored in the paste-up information storing unit.

According to the fourth aspect of the present invention, the operation screen simple-creating system, which includes: an operation screen operably connecting to a remote controlling terminal connecting to a communication line; a paste-up information section; a screen arrangement section having an input side connecting to the paste-up information section and an output side connecting to the operation screen, the screen arrangement section being operated through a user's manipulation to automatically coincide a barycenter of paste-up information inputting from the paste-up information section with a predetermined point on the operation screen.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
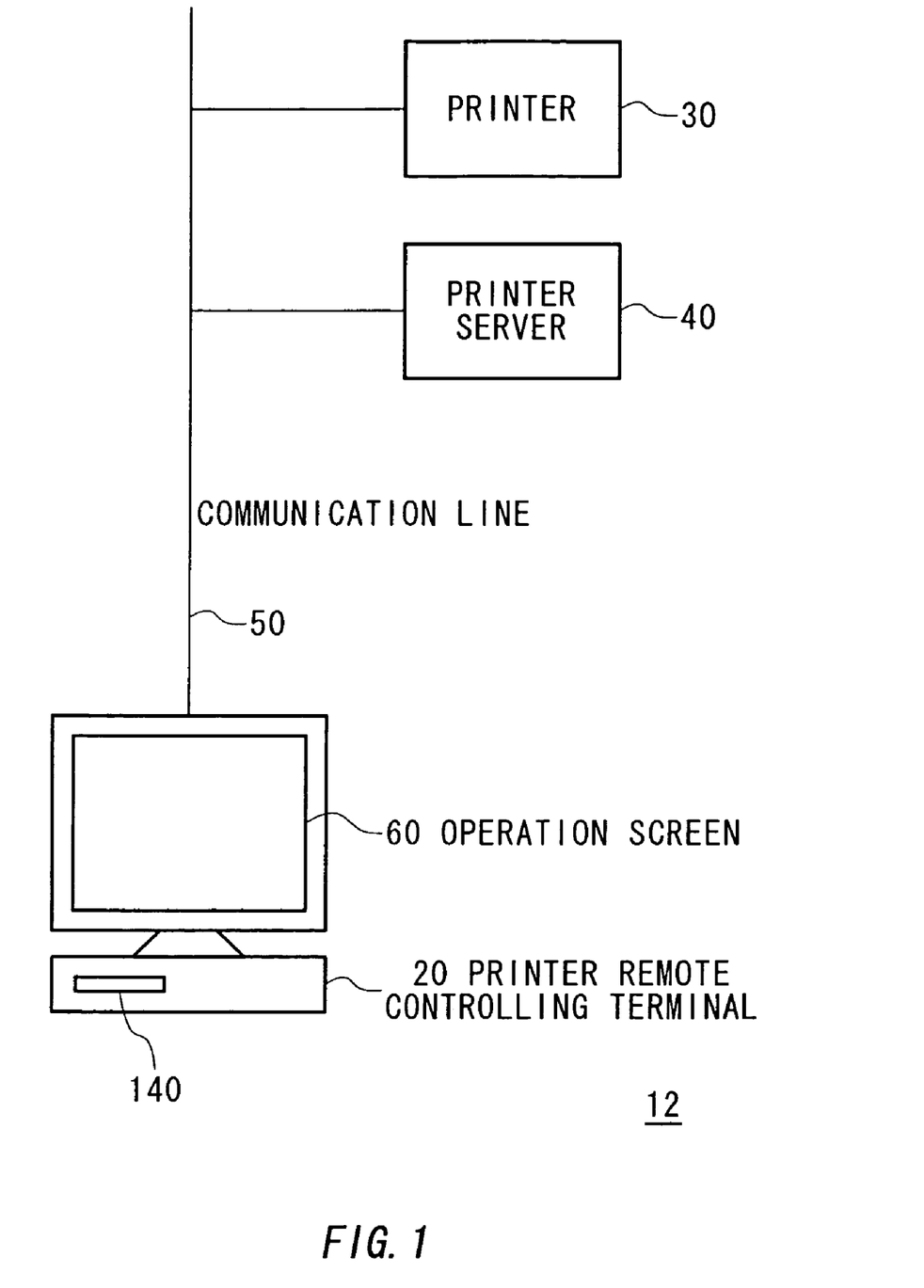
FIG. 1 illustrates a printer remote controlling system used in the present embodiment of the present invention.

FIG. 1 illustrates a printer remote controlling system used in the present embodiment of the present invention. The printer remote controlling system 12 includes a printer30, a printer server 40, a communication line 50, a printer remote controlling terminal 20, and an operation screen 60.

The printer remote controlling terminal 20, the printer 30, and the printer server 40 are connected to the communication line 50. The print order instructed by the operation screen 60 of the print remote controlling terminal 20 is sent to the printer server 40. The printer server 40 that receives the print order takes control of the printer 30 to execute printing.

Here, it is supposed that a printer remote controlling system of this kind is used as a service as described in the following. A company has a printer that prints out with high quality pictures compared to the other printers used in public and also has a lot of printer remote controlling terminals that can remote control the printer. It is a service that customers use these printer remote controlling terminals and print out images that they want to print out using the high quality picture printer. Using the company that provides this type of service (referred to as "printer service" hereinafter) as an example, the description will follow.

Figure 2:
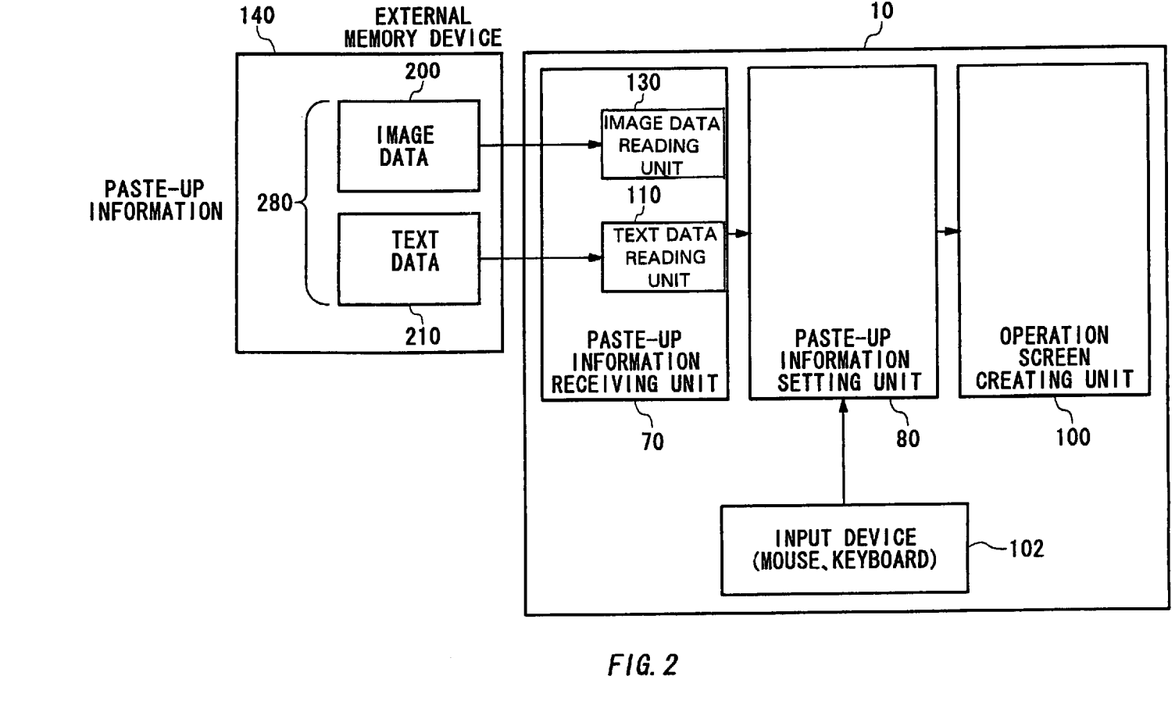
FIG. 2 is a schematic diagram showing an operation screen simple-creating system for terminals to remote control a printer according to the present embodiment of the present invention.

FIG. 2 is a schematic diagram showing an operation screen simple-creating system 10 for terminals to remote control a printer according to the present embodiment of the present invention. The operation screen simple-creating system 10 includes a paste-up information receiving unit 70, a paste-up information setting unit 80, an operation screen creating unit 100, and an input device 102, such as a mouse or a keyboard.

The paste-up information receiving unit 70 undertakes the process to read out paste-up information 280 stored in an external memory device 140, which can be communicated from the printer remote controlling terminal 20. If the reading-out of paste-up information 280 is image data 200, an image data reading unit 130 undertakes this reading process. If the reading-out of paste-up information 280 is text data 210, a text data receiving unit 110 undertakes the reading process.

Here, the image data 200 is, for example, the name or logos of a company that provides this printer service. The image data 200 has a PR effect for the company. The text data 210 is, for example, a message to customers who use the printer service with a purpose to improve the service.

To make the sentences here simple, the paste-up information 280 hereinafter means the image data 200 or the text data 210.

The paste-up information received by the paste-up information receiving unit 70 undergoes processing to be pasted on the operation screen 60 undertaken by the paste-up information setting unit 80. The paste-up information setting unit 80 will later be described in detail.

After a setting value to paste the paste-up information 280 on the operation screen 60 is decided, a new operation screen 60 is created at the operation screen creating unit 100 according to the setting of the paste-up information setting unit 80.

A series of processing under taken by the paste-up information setting unit 80 and the operation screen creating unit 100 may be undertaken for different operation screens, such as a welcome screen or a print in progress screen of the operation screen simple-creating system 10, all together. This process may easily create an operation screen simple-creating system 10 having operation screens with unified designs such as the position of the company logos and messages.

The paste-up information setting unit 80 is described below.

Figure 3:
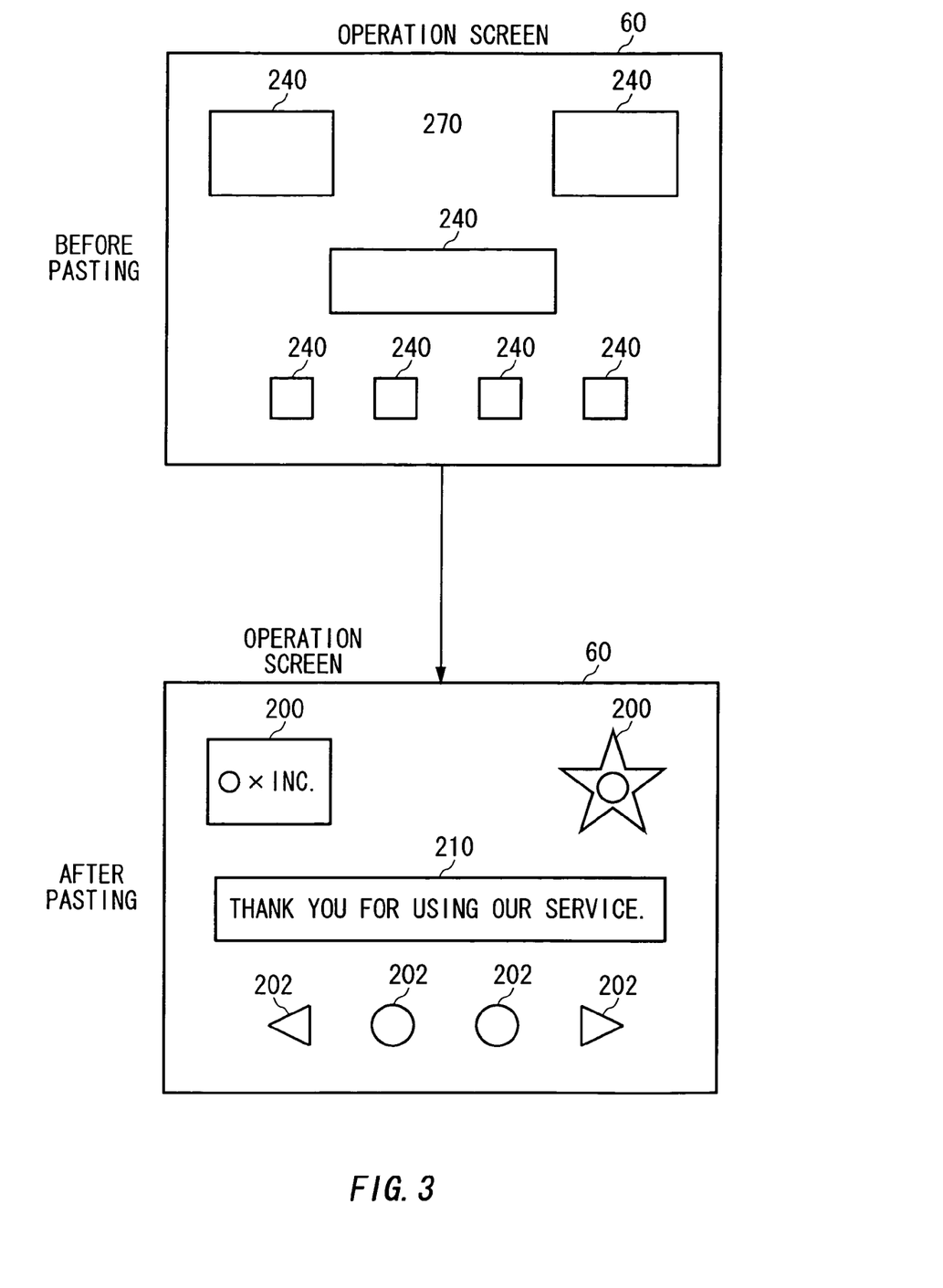
FIG. 3 illustrates the outline of the process for pasting paste-up information on an operation screen.

FIG. 3 illustrates the outline of the process for pasting paste-up information on an operation screen. The upper part of FIG. 3 illustrates an exemplary operation screen 60 before pasting paste-up information 280. The lower part of FIG. 3 illustrates an exemplary operation screen after pasting paste-up information 280. The operation screen 60 before pasting paste-up information includes a background screen 270 and information pasting regions 240 for pasting the paste-up information 280. The position and the size of the information pasting regions 240 are previously determined.

The paste-up information received by the paste-up information receiving unit 70 is firstly pasted on the preset information pasting regions 240. An automatic positioning process as described in FIG. 4 may be undertaken when pasting.

In the lower part of FIG. 3, the image data 200 of a company name and logos and the text data 210 that writes a message to customers, which is read out by the paste-up information receiving unit 70, are pasted. Operation button images 202 as operation buttons for executing, for example, printing may be pasted on the information pasting region 240 as image data for pasting and are shown at the bottom of the lower part of FIG. 3.

After the paste-up information 280 is pasted on the operation screen 60, the position and the size of the information pasting regions 240 may be edited by using the input device 102, such as a mouse. The text data 210 may be edited by the input device 102, such as a keyboard.

Since the above process may create the operation screen 60 based on the predetermined setting value for pasting, by using desired image data 200 or the text data 210, the process of altering the operation screen 60 is easier compared to creating an operation screen 60 from the start.

Figure 4:
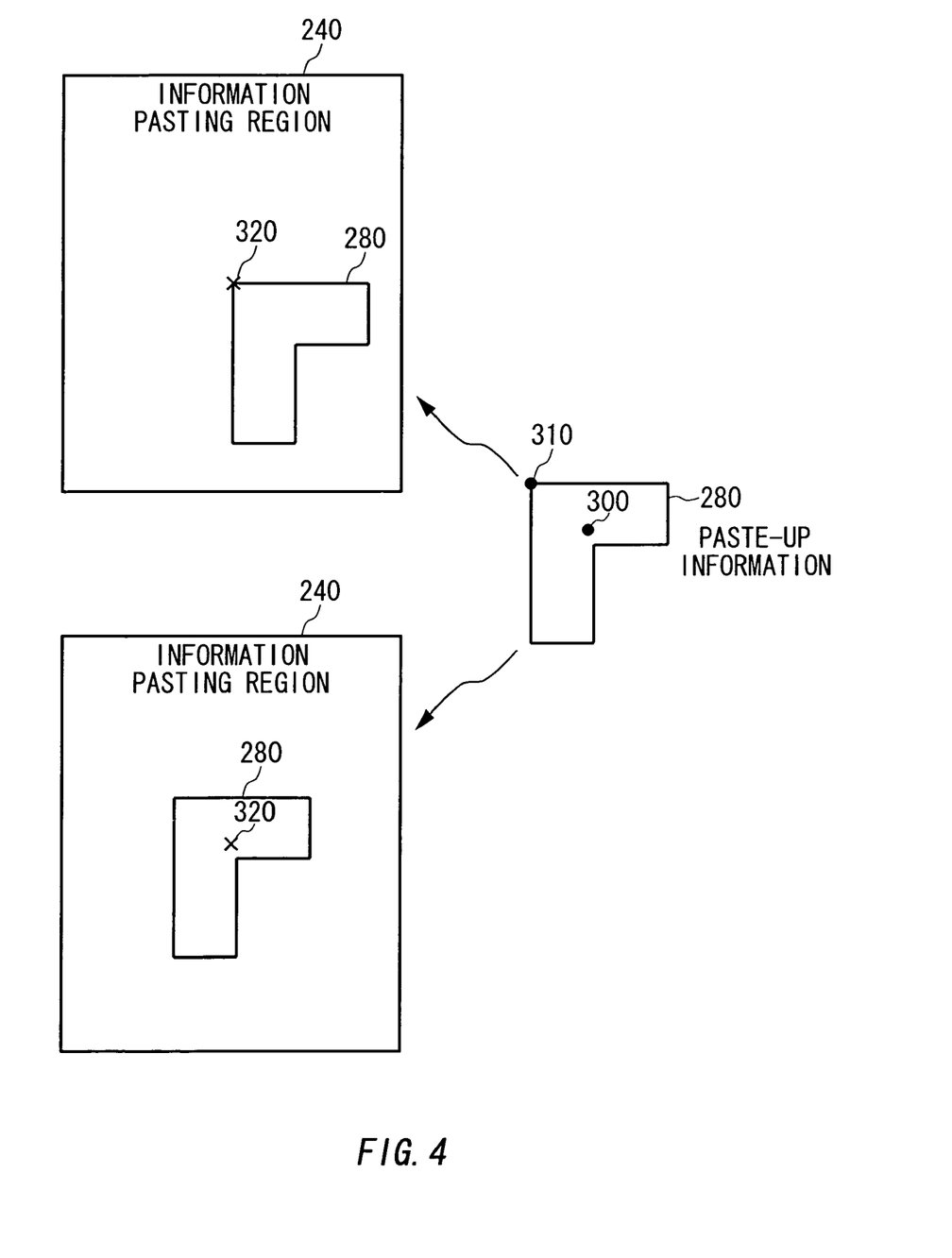
FIG. 4 illustrates the outline of the automatic positioning process for pasting paste-up information.

FIG. 4 illustrates the outline of the automatic positioning process for pasting paste-up information. The paste-up information setting unit 80 undertakes this process. For the automatic positioning process of FIG. 4 as described below, a paste-up information barycenter 300 is obtained in each of the paste-up information 280. Also, a paste-up information region center 310 is obtained in the information pasting region 240. If the paste-up information 280 is the text data 210, the center of the text data is used instead of the paste-up information barycenter 300. When the paste-up information is pasted on the information pasting region 240, the paste-up information 280 is pasted such that the paste-up information barycenter 300 coincides with the paste-up information region center 320.

On the other hand, for the automatic positioning process of FIG. 4 as described in the above, the left-hand point in the above of the paste-up information 280 is supposed to be a paste-up information basing point 310. When the paste-up information 280 is pasted on the information pasting region 240, the paste-up information 280 is pasted so that the paste-up information basing point 310 coincides with the paste-up information region center 320. The automatic positioning process may be conducted when the paste-up information 280 is moved to the amount of a predetermined ratio in a predetermined position on the operation screen 60 in which the paste-up information is to be pasted. The automatic positioning process to paste the paste-up information 280 by coinciding the paste-up information barycenter 300 with the paste-up information region center 320 may achieve a balanced position regardless of the shape of the paste-up information 280 rather than coinciding the paste-up information basing point 310 with the paste-up information region center 320.

Moreover, the paste-up information setting unit 80 may undertake the automatic process as described below relating to the setting of the size of the paste-up information 280.

If the paste-up information 280 is small compared to the preset information pasting region 240 and the information pasting region 240 has a lot of space, or if the paste-up information is big compared to the preset information pasting region 240 and the paste-up information 280 spills over the information pasting region 240, the size of the paste-up information 280 maybe automatically altered so that the paste-up information 280 is enlarged or reduced to be the largest in the information pasting region 240, though it is not shown in the FIGS. Directions of the paste-up information 280 may be freely changed also.

Thus, screen pages that customers can easily look at may be created automatically regardless of the size of the paste-up information 280.

When all of the paste-up information 280 is ready to be pasted, the information pasting region 240 is erased. For the part of the information pasting region 240 that has not been pasted, the background screen 270 is displayed.

Figure 5:
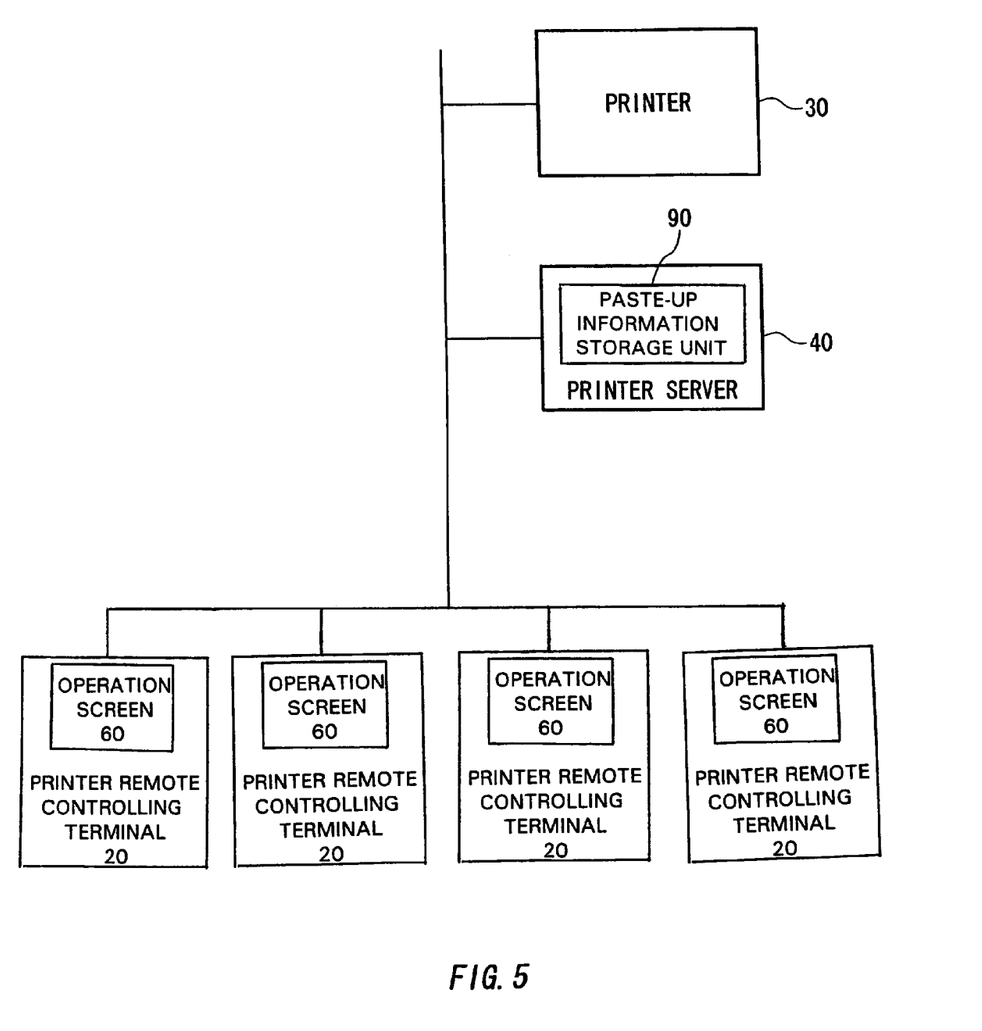
FIG. 5 illustrates the outline of the structure establishing a connected paste-up information storing unit to be communicated from a plurality of printer remote controlling terminals.

FIG. 5 illustrates the outline of the structure establishing a connected paste-up information storing unit to be communicated from a plurality of printer remote controlling terminals. The paste-up information storing unit 90 is connected with a plurality of printer remote controlling terminals 20 to be communicated. In FIG. 5, the paste-up information storing unit 90 is equipped in the printer server 40. The external memory device 140, which is shown in FIG. 2, of the printer remote controlling terminal 20 may function as the paste-up information storing unit 90.

The setting value relating to the pasting of the paste-up information 280 set in the paste-up information setting unit 80 may be recorded to the paste-information storing unit 90. The setting value recorded in the paste-up information storing unit 90 may be read out.

Thus, if a user makes and records a setting value relating to the paste-up information 280 in the operation screen 60, and if the setting value is read out as the common value, then all of the operation screens 60 of one printer remote controlling terminal 20 may be altered at once.

Further, the altering process for all the operation screens 60 of a plurality of printer remote controlling terminals 20 may be conducted by using the common paste-up information 280 and the recorded setting value through the communication line 50. That is, a plurality of the printer remote controlling terminals 20 may be able to alter the setting value of the same paste-up information 280 as the operation screen 60 of other printer remote controlling terminals 20 according to any needs. Furthermore, the operation screens 60 of a plurality of the printer remote controlling terminals 20 may be able to be altered all together by using the setting value of the common paste-up information 280 for those that control the printer remote controlling system 12.

Therefore, companies that provide the printer service may be able to manage the operation screens 60 by using the communication line 50, which was originally connected in order to send orders to print. Thus, an effective usage of the printer remote controlling system 12 may be achieved.

As is obvious from the description above, operation screens used for remote controlling terminals that can remote control printers connected to the communication line may be easily made, according to the present invention.

Although the present invention has been described by way of exemplary embodiments, it should be understood that those skilled in the art might make many changes and substitutions without departing from the spirit and the scope of the present invention, which is defined only by the appended claims. For example, the present invention may be achieved in the form of a recording medium that stores a program to make a computer to execute the processing undertaken by the above operation screen creating system.

What is claimed is:

1. An operation screen creating system for creating an operation screen, said system comprising:
   a paste-up information receiving unit for receiving paste-up information to paste on information pasting regions on the operation screen;
   a paste-up information setting unit for setting a position and size of said paste-up information to be pasted on the information pasting regions on the operation screen, a barycenter of said paste-up information coinciding with a predetermined point on the operation screen; and
   an operation screen creating unit for creating a new operation screen according to a result of the setting set by said paste-up information setting unit,
   wherein said operation screen is for a control terminal which controls a remote terminal via a Communication line,
   wherein said operation screen creating unit comprises an editing device for editing at least one of a position and size of said information pasting regions to create said operation screen for controlling said remote terminal,
   wherein said paste-up information is pasted on said information pasting regions based on a relative position and size of said information pasting regions,
   wherein said paste-up information setting unit undertakes an automatic positioning setting process for coinciding said barycenter of said paste-up information received by said paste-up information receiving unit with a predetermined point on the operation screen, and
   wherein said automatic positioning setting process is conducted when said paste-up information is moved to an amount of a predetermined ratio in a predetermined position on the operation screen in which said paste-up information is to be pasted.

2. The operation screen creating system as claimed in claim 1, wherein said paste-up information receiving unit includes at least one of an image data reading unit for receiving image data and a text data receiving unit for receiving text data.

3. The operation screen creating system as claimed in claim 1, further comprising:
   an external memory device in communication with said control terminal,
   wherein said paste-up information receiving unit reads out said paste-up information from a file recorded in said external memory device.

4. The operation screen creating system as claimed in claim 1, wherein said operation screen creating unit creates a plurality of the operation screens, having different designs based on a common setting value relating to a position, size, and direction of said paste-up information.

5. The operation screen creating system as claimed in claim 1, wherein said control terminal comprises a plurality of control terminals, and said system further comprises:
   a paste-up information storing unit connecting to said communication line, said paste-up information storing unit being in communication with said plurality of said control terminals for storing therein a setting value relating to a position, size and direction of said paste-up information set by said paste-up information setting unit,
   wherein the operation screen of said plurality of control terminals is updated in accordance with said setting value of said paste-up information stored in said paste-up information storing unit.

6. The operation screen creating system as claimed in claim 1, wherein said remote terminal comprises a printer.

7. The operation screen creating system as claimed in claim 1, wherein said operation screen is located at said control terminal.

8. The operation screen creating system as claimed in claim 1, further comprising:
   a display device connected to said control terminal, said operation screen being displayed by said display device.

9. The operation screen creating system as claimed in claim 1, wherein said remote terminal comprises a plurality of remote terminals.

10. An operation screen creating method for creating an operation screen, said method comprising:
    receiving paste-up information to paste on information pasting regions on said operation screen using a paste-up information receiving unit;
    setting a position and size of said paste-up information to be pasted on said information pasting regions on the operation screen using a paste-up information setting unit, a barycenter of said paste-up information coinciding with a predetermined point on the operation screen; and
    creating a new operation screen using an operation screen creating unit according to the setting set by said paste-up information setting unit,
    wherein said new operation screen is for a control terminal which controls a remote terminal via a communication line,
    wherein said operation screen creating wilt comprises an editing device for editing at least one of a position and size of said information pasting regions to create said new operation screen for controlling said remote terminal,
    wherein said paste-up information is pasted on said information pasting regions based on a relative position and size of said information pasting regions, wherein said setting said position and size comprises an automatic positioning setting for coinciding said barycenter of said paste-up information received by said paste-up information receiving unit with a predetermined point in the operation screen, and wherein said automatic positioning setting is conducted when said paste-up information is moved to an mount of a predetermined ratio in a predetermined position on the operation screen in which said paste-up information is to be pasted.

11. The operation screen creating method as claimed in claim 10, wherein said receiving said paste-up information comprises at least one of receiving image data and receiving text data.

12. The operation screen creating method as claimed in claim 10, wherein said receiving said paste-up information comprises reading out said paste-up information from a file recorded in an external memory device in communication with said control terminal.

13. The operation screen creating method as claimed in claim 10, wherein said creating said new operation screen comprises creating a plurality of the operation screens all together, having different designs based on a common setting value relating to a position, size, and direction of said paste-up information.

14. The operation screen creating method as claimed in claim 10, further comprising:

storing in a paste-up information storing unit connected to said communication line a setting value relating to a position, size, and direction of said paste-up information set by said paste-up information setting unit; and updating the operation screen of said control terminal by using said setting value of said paste-up information stored in said paste-up information storing unit.

15. A recording medium that stores a program including instructions for performing a method for creating an operation screen, the method comprising:

receiving paste-up information to paste on information pasting regions on the operation screen using a paste-up information receiving unit;

setting a position and size of said paste-up information to be pasted on the information pasting regions on said operation screen using a paste-up information setting unit, a barycenter of said paste-up information coinciding with a predetermined point on the operation screen; and creating a new operation screen according to the setting set by said paste-up information setting unit, wherein said new operation screen is for a control terminal which controls a remote terminal via a communication line, wherein said creating said new operation screen comprises editing at least one of a position and size of said information pasting regions to create said new operation screen for controlling said remote terminal, wherein said paste-up information is pasted on said information pasting regions based on a relative position and size of said information pasting regions, wherein said setting said position and size comprises an automatic positioning setting for coinciding said barycenter of said paste-up information received by said paste-up information receiving unit with a predetermined point in the operation screen, and wherein said automatic positioning setting is conducted when said paste-up information is moved to an amount of a predetermined ratio in a predetermined position on the operation screen in which said paste-up information is to be pasted.

16. The recording medium as claimed in claim 15, wherein said receiving comprises at least one of receiving image data and receiving text data.

17. The recording medium as claimed in claim 15, wherein said receiving comprises reading out said paste-up information from a file recorded in a connected external memory device to be communicated from the terminal.

18. The recording medium as claimed in claim 15, wherein said creating said new operation screen comprises creating a plurality of the operation screens all together, having different designs based on a common setting value relating to a position. size, and direction of said paste-up information.

19. The recording medium as claimed in claim 15, the method further comprising;

storing in a paste-up information storing unit connected to said communication line a setting value relating to a position. size, and direction of said paste-up information set by said paste-up information setting unit; and updating the operation screen of said control terminal by using said setting value of said paste-up Information stored in said paste-up information storing unit.

20. An operation screen creating system, comprising:

a display device for displaying an operation screen said display device being operably connecting to a control terminal connecting to a communication line;

a paste-up information section;

a paste-up information receiving unit for receiving paste-up information; and a screen arrangement section having an input side connecting to said paste-up information section and an output side connecting to said display device, said screen arrangement section being operated by a user to automatically coincide a barycenter of paste-up information inputting from said paste-up information section with a predetermined point on said operation screen, wherein said screen arrangement section comprises an editing device for editing at least one of a position and size of information pasting regions on said operation screen to create said operation screen for controlling a remote terminal, wherein said paste-up initiation is pasted on said information pasting regions based on a relative position and size of said information pasting regions, wherein said editing device undertakes an automatic positioning setting process for coinciding said barycenter of said paste-up information received by said paste-up information receiving unit with a predetermined point on the operation screen; and wherein said automatic positioning setting process is conducted when said paste-up information is moved to an amount of a predetermined ratio in a predetermined position on the operation screen in which said paste-up information is to be pasted.

21. A tool for creating an operation screen for operating a remote printer, Comprising:

a memory device which stores information to be displayed in said operation screen for operating a remote printer;

a processor which causes a display device to display preset information pasting regions on a background screen, and causes said information to be displayed on said preset information pasting regions;

a paste-up information receiving unit for receiving paste-up information; and an editing device for editing at least one of a position and size of said preset information pasting regions to create said operation screen for operating a remote printer, wherein said paste-up information is pasted on said information pasting regions based on a relative position and size of said information pasting regions, wherein said editing device undertakes an automatic positioning setting process for coinciding a barycenter of said paste-up information received by said paste-up information receiving unit with a predetermined point on the operation screen, and wherein said automatic positioning setting process is conducted when said paste-up information is moved to an amount of a predetermined ratio in a predetermined position on the operation screen in which said paste-up information is to be pasted.

22. The tool according to claim 21, wherein said operation screen comprises a background screen and said information pasting regions comprise outlined areas displayed on said background screen.

23. The tool according to claim 22, wherein said outlined areas are erased from said operation screen when said information is ready to be pasted.

24. The tool according to claim 21, wherein a size of said information is altered one of automatically based on a size of said information pasting regions, and based on a user input.

25. The tool according to claim 21, wherein said editing device comprises one of an automatic editing device which automatically edits a position and size of said information pasting regions and a user-operated editing device which edits a position and size of said information pasting regions according to a user operation.

26. A method for creating an operation screen for operating a remote printer, comprising:

storing information to be displayed in said operation screen for operating a remote printer;

displaying preset information pasting regions on a background screen, and displaying said information on said preset information pasting regions;

receiving paste-up information using a paste-up information receiving unit; and editing at least one of a position and size of said preset information pasting regions to create said operation screen for operating a remote printer, wherein said paste-up information is pasted on said information pasting regions based on a relative position and size of said information pasting regions, wherein said editing said position and size comprises an automatic positioning setting for coinciding barycenter of said paste-up information received by said paste-up information receiving unit with a predetermined point in the operation screen, end wherein said automatic positioning setting is conducted when said paste-up information is moved to an amount of a predetermined ratio in a predetermined position on the operation screen in which said paste-up information is to be pasted.

27. The method according to claim 26, wherein said operation screen comprises a background screen and said information pasting regions comprise outlined areas displayed on said background screen.

28. The method according to claim 27, further comprising:

erasing said outlined areas from said operation screen when said information is ready to be pasted.

29. The method according to claim 26, further comprising:

altering a size of said information one of automatically based on a size of said information pasting regions, and based on a user input.

* * * * *